US007969279B2

(12) United States Patent
Nakamura

(10) Patent No.: US 7,969,279 B2
(45) Date of Patent: Jun. 28, 2011

(54) REMOTE CONTROL SYSTEM AND PRESETTING METHOD FOR REMOTE COMMANDER

(75) Inventor: Tetsuya Nakamura, Ibaraki (JP)

(73) Assignee: Sony Corporation, Tokyo (JP)

( * ) Notice: Subject to any disclaimer, the term of this patent is extended or adjusted under 35 U.S.C. 154(b) by 832 days.

(21) Appl. No.: 11/544,717

(22) Filed: Oct. 10, 2006

(65) Prior Publication Data

US 2007/0090968 A1 Apr. 26, 2007

(30) Foreign Application Priority Data

Oct. 24, 2005 (JP) ................................ 2005-308773

(51) Int. Cl.
*G05B 23/02* (2006.01)

(52) U.S. Cl. .......... 340/3.1; 340/3.7; 340/3.71; 340/3.9; 725/133; 398/106; 398/107; 341/176

(58) Field of Classification Search ............. 340/825.22, 340/825.69, 825.24, 825.25, 3.1, 3.9, 3.7, 340/3.71, 10.5; 341/176; 398/106, 107, 398/108; 725/131–134, 139–142, 151–153
See application file for complete search history.

(56) References Cited

U.S. PATENT DOCUMENTS 4,418,333 A * 11/1983 Schwarzbach et al. .. 340/310.11
4,817,203 A * 3/1989 Tsurumoto et al. ........... 398/106
5,499,018 A * 3/1996 Welmer ....................... 340/3.51
5,815,297 A * 9/1998 Ciciora ......................... 398/112
5,923,268 A * 7/1999 Takahashi et al. ....... 340/825.69
6,574,798 B1 * 6/2003 Bradley et al. ................ 725/153
6,747,568 B1 * 6/2004 Teskey ..................... 340/825.72
7,339,493 B2 * 3/2008 El Zabadani et al. ...... 340/825.7
7,345,593 B2 * 3/2008 Park et al. ................ 340/825.72
7,509,024 B2 * 3/2009 Takaoka et al. ............... 386/299
(Continued)

FOREIGN PATENT DOCUMENTS

EP 1 061 490 A2 12/2000
(Continued)

OTHER PUBLICATIONS

Notification of Reasons for Refusal, issued by Japanese Patent Office on Mar. 9, 2010 in the counterpart application No. 2005-308773.

(Continued)

*Primary Examiner* — Daniel Wu
*Assistant Examiner* — Ryan W Sherwin
(74) *Attorney, Agent, or Firm* — Finnegan, Henderson, Farabow, Garrett & Dunner, L.L.P.

(57) ABSTRACT

Disclosed herein is a remote control system including a remote commander and a main device having a capability to connect with a subordinate device. The main device includes: a display; a first storage device for storing a plurality of sets of remote control codes; a first signal reception circuit; a first signal transmission circuit for, e.g., transmitting to the remote commander a set of remote control codes corresponding to a subordinate device; and a control unit. The remote commander includes: a second signal reception circuit for receiving the set of remote control codes; a second storage device for storing the set of remote control codes; a second signal transmission circuit; and an operation section for transmitting a remote control code transmission control signal for causing the control unit to perform remote control code transmission control for selecting the set of remote control codes and transmitting the set of remote control codes.

6 Claims, 11 Drawing Sheets

U.S. PATENT DOCUMENTS

| | | | | |
|---|---|---|---|---|
| 2001/0011940 | A1* | 8/2001 | Williams et al. | 340/3.9 |
| 2002/0174270 | A1* | 11/2002 | Stecyk et al. | 710/1 |
| 2003/0095211 | A1* | 5/2003 | Nakajima | 348/734 |
| 2005/0013584 | A1* | 1/2005 | Takaoka et al. | 386/46 |

FOREIGN PATENT DOCUMENTS

| | | |
|---|---|---|
| EP | 1 069 694 A1 | 1/2001 |
| JP | 4-267696 | 9/1992 |
| JP | 9-322013 | 12/1997 |
| JP | 2001-268663 | 9/2010 |
| WO | WO 98/33332 A1 | 7/1998 |

OTHER PUBLICATIONS

European Search Report, issued by European Patent Office, dated Mar. 15, 2010, in the counterpart European application No. EP 06 25 5158.

* cited by examiner

REMOTE CONTROL SYSTEM AND PRESETTING METHOD FOR REMOTE COMMANDER

CROSS REFERENCES TO RELATED APPLICATIONS

The present invention contains subject matter related to Japanese Patent Application JP 2005-308773, filed in the Japanese Patent Office on Oct. 24, 2005, the entire contents of which being incorporated herein by reference.

BACKGROUND OF THE INVENTION

1. Field of the Invention

The present invention relates to a remote control system for remotely controlling, for example, a television receiver and its peripheral devices such as a video tape recorder (VTR), a digital versatile disc (DVD) player, and an audio amplifier (AMP), and to a presetting method for a remote commander.

2. Description of the Related Art

There has already been proposed a remote commander for remotely controlling, for example, a television receiver and its peripheral devices such as a video tape recorder, a DVD player, and an audio amplifier.

Television receivers, video tape recorders, DVD players, and audio amplifiers from different manufacturers generally have different remote control codes used for remote control, and different models of such devices generally have different remote control codes.

As such, there has already been proposed a remote commander that is adapted to remotely control different manufacturers' and different models of devices, such as television receivers, video tape recorders, DVD players, and audio amplifiers. Such a remote commander includes within itself a storage device, such as a ROM, for storing remote control codes for each model of devices from each manufacturer, and in this storage device are stored beforehand remote control codes corresponding to each model of devices, such as television receivers, video tape recorders, DVD players, audio amplifiers, from each manufacturer (Manufacturer A, Manufacturer B, Manufacturer C, etc.). When performing remote control, a preset key, a select key, etc., are used to cause remote control codes corresponding to the model of the device that is to be manipulated to be read from the aforementioned storage device, and the read codes are used as remote control codes for remote control.

In addition, Japanese Patent Laid-open No. Hei 4-267696 (as referred to Patent Document 1 hereinafter) discloses a technique of storing remote control codes defined independently for different models of devices (e.g., television receivers) from different manufacturers beforehand in a memory provided within a main body of a VTR. In this exemplary related art technique, a mode switch key, an item select key, a set key, an execute key, and a display section each provided on the main body of the VTR are used to cause remote control codes corresponding to a device to be manipulated or the manufacturer of the device to be read from the memory, and the read remote control codes are transferred from the main body of the VTR to a remote commander via a wire.

SUMMARY OF THE INVENTION

However, the abovementioned remote commander that includes the storage device, such as a ROM, that has stored beforehand therein the remote control codes corresponding to each model of devices (e.g., television receivers, video tape recorders, DVD players, and audio amplifiers) from each manufacturer (Manufacturer A, Manufacturer B, Manufacturer C, etc.) have some drawbacks. Specifically, as the number of models of devices that are compatible with the remote commander increases, the storage capacity need be increased. In addition, as there is a need to perform a setting of the remote control codes by shifting to a setting mode (which is an additional mode, prepared in addition to a mode for utilizing the remote commander) and retrieving the remote control codes as stored beforehand, the storage capacity need be large enough to hold a program for performing that setting in addition to the data of the remote control codes. Thus, as the ROM or the like in the remote commander may require more storage capacity, the remote commander becomes more complicated and more costly.

Further, when retrieving the remote control codes as stored beforehand, a user may have to perform multiple pressing of keys or the like, which may lead to unsuccessful setting or difficulty in completing this operation.

Still further, because the remote control codes are stored beforehand in the aforementioned storage device, such as a ROM, it is difficult to update the remote control codes.

Meanwhile, the technique as disclosed in Patent Document 1 involves a problem of lack of ease of operation because the presetting of the remote commander is performed by using the mode switch key, the item select key, the set key, the execute key, which are provided on the main body of the VTR.

An advantage of the present invention is making it possible to reduce the cost of a remote commander and to complete the presetting of the remote control codes in this remote commander satisfactorily with ease of operation.

A remote control system according to one embodiment of the present invention includes: a main device having a capability to connect with a subordinate device; and a remote commander. The main device includes display means, first storage means, first signal reception means, first signal transmission means, and control means. The first storage means stores a plurality of sets of remote control codes for controlling different models of subordinate devices from different manufacturers, each set of remote control codes corresponding to a separate model of a subordinate device. The first signal reception means receives from the remote commander a first remote control signal for controlling the main device. The first signal transmission means transmits, to a subordinate device connected to the main device, a second remote control signal for controlling the subordinate device, and transmitting to the remote commander a set of remote control codes corresponding to the subordinate device stored in the first storage means. The control means controls the first storage means, the display means, and the first signal transmission means based on the received first remote control signal. The remote commander includes second signal reception means, second storage means, second signal transmission means, and an operation section. The second signal reception means receives the set of remote control codes transmitted from the first signal transmission means. The second storage means stores the set of remote control codes received by the second signal reception means. The second signal transmission means transmits the first remote control signal for controlling the main device and transmitting a third remote control signal based on the set of remote control codes and for controlling the subordinate device. The operation section transmits, as the first remote control signal, a remote control code transmission control signal for causing the control means to perform remote control code transmission control for selecting the set of remote control codes for controlling the subordinate device from among the plurality of sets of remote control codes stored in the first storage means of the main device and transmitting the set of remote control codes via the first signal transmission means.

According to one embodiment of the present invention, when presetting in the remote commander a set of remote control codes corresponding to a subordinate device which are not stored in the second storage means of the remote commander, the set of remote control codes stored in the first storage means of the main device are selected using the operation section of the remote commander and referring to display on the display means of the main device. Then, the set of remote control codes thus selected are transmitted to the remote commander. Thus, the operation of presetting is easy, and since the first storage means for storing remote control codes for different models of devices from different manufacturers is not provided within the remote commander, the remote commander can be prevented from becoming complicated in structure, and since there is no need for a large-capacity ROM to be provided therein, the remote commander can be prevented from becoming costly.

DETAILED DESCRIPTION OF THE PREFERRED EMBODIMENT

Hereinafter, a remote control system and a presetting method for a remote commander according to a preferred embodiment of the present invention will be described with reference to the accompanying drawings.

Figure 1:
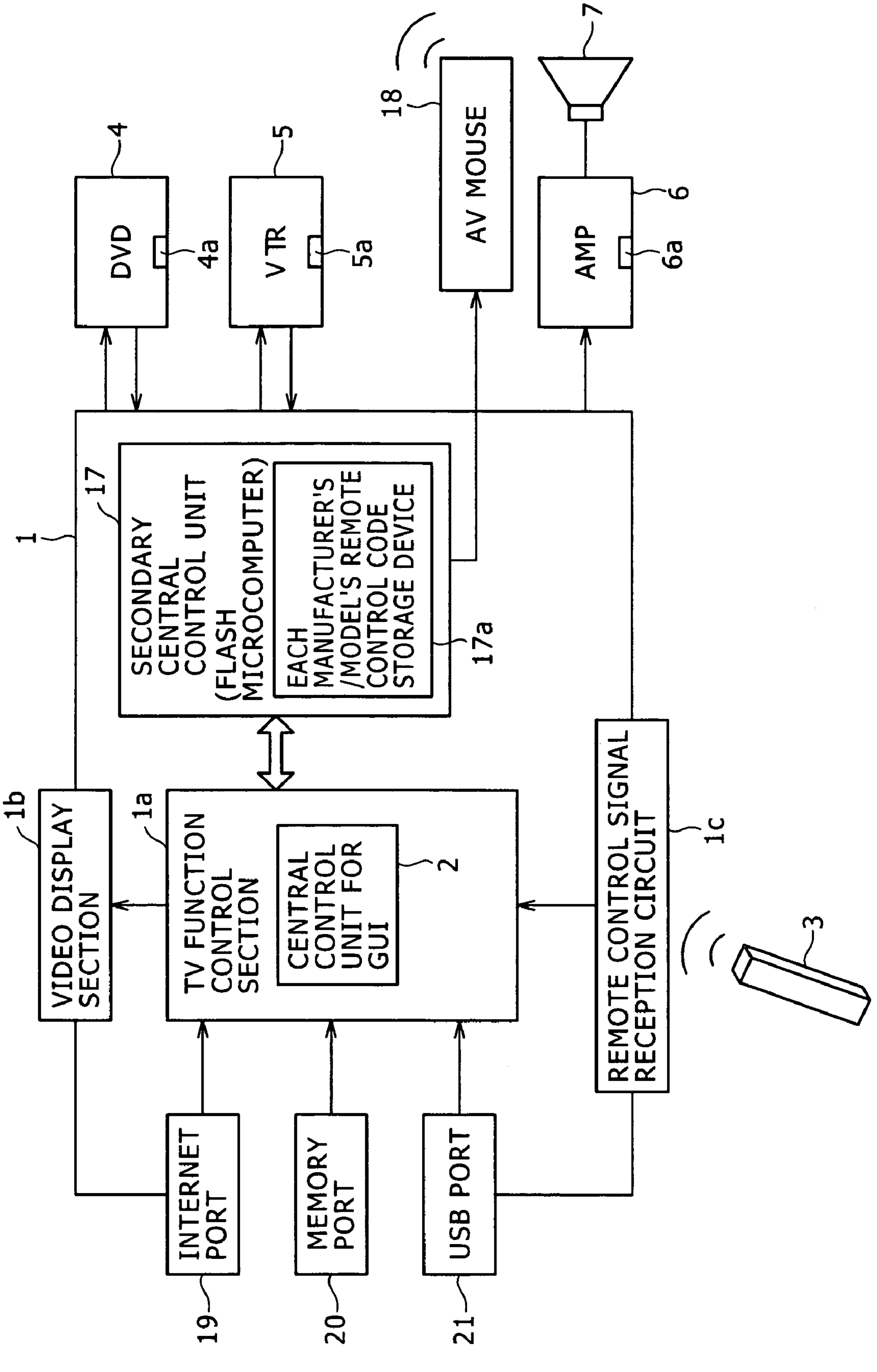
FIG. 1 is a diagram illustrating the structure of a remote control system according to one embodiment of the present invention.

In FIG. 1, reference numeral 1 indicates a television receiver, which constitutes a main device. The television receiver 1 generally has a well-known structure and is provided with a television function control section 1*a* formed by, e.g., a main central control unit formed by a microcomputer. Video signals are supplied from the television function control section 1*a* to a video display section 1*b* formed by a liquid crystal display or the like, and the video display section 1*b* produces a desired television video screen.

The television function control section 1*a* has a central control unit 2 for a graphical user interface (GUI). The central control unit 2 for GUI is formed by a known microcomputer or the like and includes a predetermined program. The central control unit 2 for GUI displays a predetermined menu screen, a predetermined item screen, and the like on the video display section 1*b*.

In FIG. 1, reference numeral 1*c* indicates a remote control signal reception circuit that receives infrared remote control signals from a remote commander 3. Various operations of the television receiver are remotely controlled via the remote control signals supplied via the remote control signal reception circuit 1*c*.

Video signals and audio signals obtained by the television receiver 1 can be supplied to a DVD player 4 and a video tape recorder 5, which are exemplary peripheral devices constituting subordinate devices. In addition, video signals and audio signals obtained by the DVD player 4 and the video tape recorder 5 can be supplied to the television receiver 1, and the television receiver 1 is capable of performing reproduction using the video display section 1*b* and the like.

In addition, the audio signals obtained by the television receiver 1 can be supplied to a loudspeaker 7 via an audio amplifier 6, and reproduction of the audio signals supplied from the television receiver 1 can be performed.

The DVD player 4, the video tape recorder 5, and the audio amplifier 6 include remote control signal reception circuits 4*a*, 5*a*, and 6*a*, respectively, for receiving infrared remote control signals, and each of them is capable of being remotely controlled via the infrared remote control signals transmitted from the remote commander 3.

Figure 2:
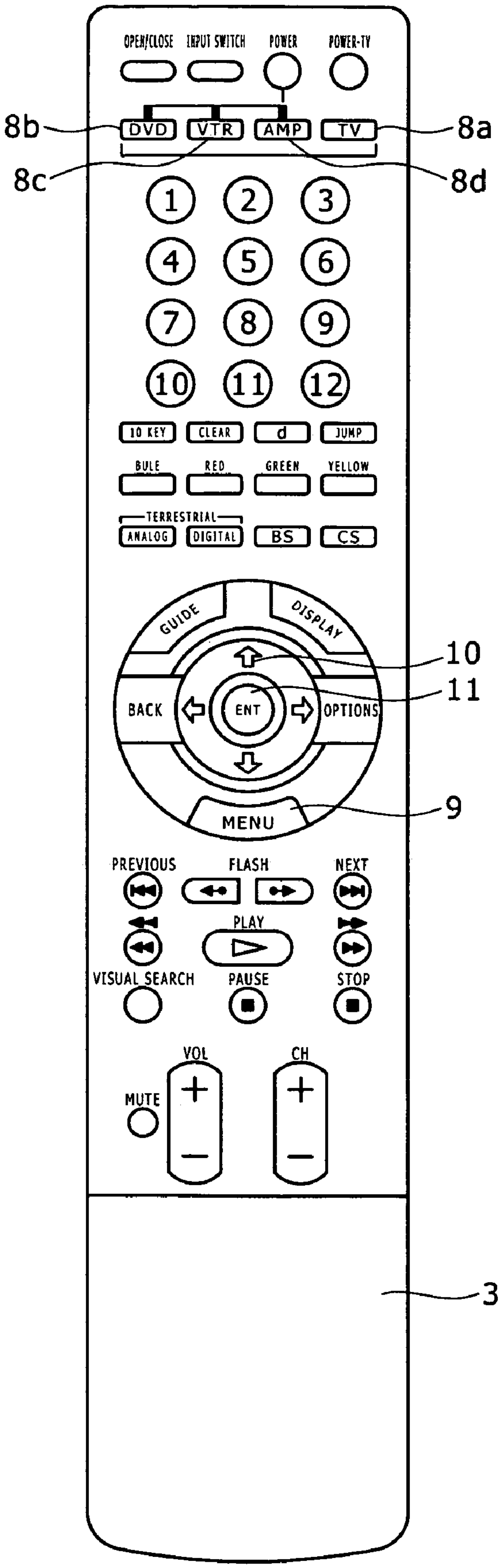
FIG. 2 is an outside view of an exemplary remote commander as shown in FIG. 1.

As illustrated in FIG. 2, the remote commander 3 according to this embodiment has selection buttons 8*a*, 8*b*, 8*c*, and 8*d* for selecting a device to be manipulated. Operating an appropriate one of the selection buttons 8*a*, 8*b*, 8*c*, and 8*d* allows the remote commander 3 to be usable as a remote commander for remotely controlling any desired one of the television receiver 1, the DVD player 4, the video tape recorder 5, and the audio amplifier 6.

Figure 8:
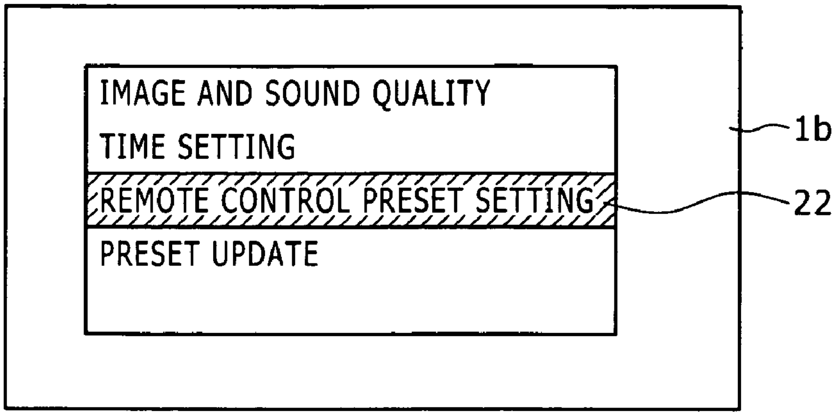
FIG. 8 is a diagram for explaining one embodiment of the present invention.

In FIG. 2, reference numeral 9 indicates a menu key. When the menu key 9 is operated, the central control unit 2 for GUI of the television receiver 1 operates to display a GUI screen showing menu items as illustrated in FIG. 8 on the video display section 1*b* of the television receiver 1.

In FIG. 2, reference numeral 10 indicates a select key for moving a cursor 22 displayed on the video display section 1*b* upward, downward, leftward, or rightward in accordance with the GUI screen and selecting an item displayed on the GUI screen. Reference numeral 11 indicates an enter key for determining the selection by the select key 10.

Figure 3:
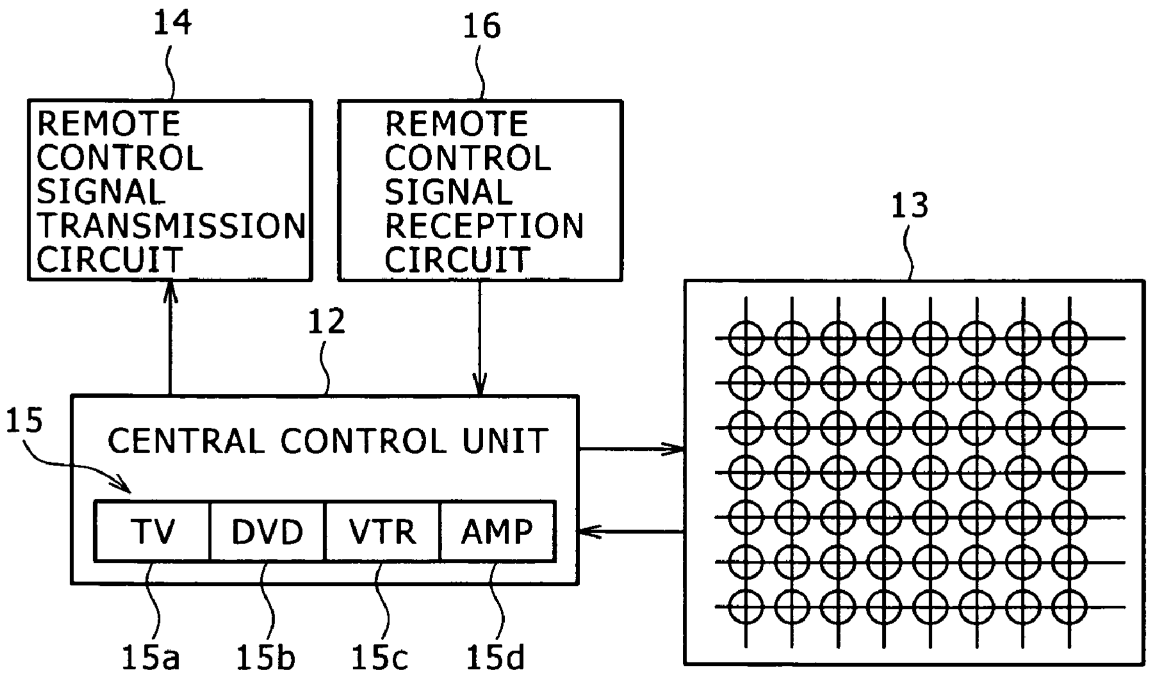
FIG. 3 is a diagram illustrating the structure of the exemplary remote commander as shown in FIG. 1.

FIG. 3 is a block diagram of the remote commander 3. The remote commander 3 includes a central control unit 12 formed by a microcomputer, a key matrix 13 forming a group of keys and connected to the central control unit 12, and a remote control signal transmission circuit 14 for transmitting an infrared remote control signal.

The central control unit 12 includes a remote control code storage device 15 including storage regions 15*a*, 15*b*, 15*c*, and 15*d* primarily designed for storing remote control codes for a television receiver 1, a DVD player 4, a video tape recorder 5, and an audio amplifier 6, respectively.

The central control unit 12 reads, from the remote control code storage device 15, a remote control code corresponding to a key operated at the key matrix 13, converts the read remote control code to a remote control signal, and transmits the remote control signal via the remote control signal transmission circuit 14.

In this embodiment, the remote commander 3 further includes a remote control signal reception circuit 16 for receiving an infrared remote control signal. A remote control signal supplied from a device to the remote control signal reception circuit 16 is converted to a remote control code, and the remote control code is written to a corresponding one of the storage regions 15*a*, 15*b*, 15*c*, and 15*d* in the remote control code storage device 15. In the case where other data has already existed in the corresponding storage region, that data may be overwritten by the remote control code. In this embodiment, it is assumed that the storage region 15*a* has stored therein the remote control codes for the television receiver 1. In the other respects, the remote commander 3 has the same structure as well-known remote commanders.

In this embodiment, as illustrated in FIG. 1, the television receiver 1 further includes a secondary central control unit 17 formed by a flash microcomputer or the like. The secondary central control unit 17 is connected via a bus to the main central control unit formed by a microcomputer and forming the television function control section 1*a* of the television receiver 1.

Figure 4:
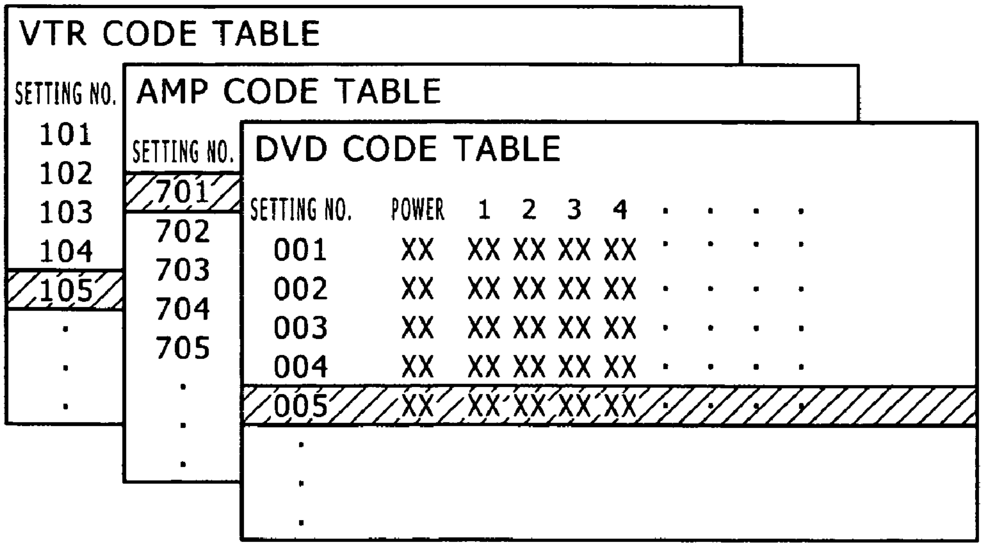
FIG. 4 is a diagram for explaining one embodiment of the present invention.

In this embodiment, the secondary central control unit 17 includes an "each manufacturer's/model's remote control code storage device" 17*a*. In the each manufacturer's/model's remote control code storage device" 17*a* are stored beforehand a plurality of sets of remote control codes for subordinate devices (e.g., the DVD player 4, the video tape recorder 5, and the audio amplifier 6), each set of the remote control codes being defined independently by different manufacturers (Manufacturer A, Manufacturer B, Manufacturer C, etc.) and for different models as illustrated in FIG. 4.

In addition, in this embodiment, a so-called AV mouse 18 is provided to form an infrared signal transmitter that is operable, for example, to specify to the DVD player 4 and the video tape recorder 5 a time at which to start a recording operation via an infrared signal. Such an instruction is issued from the secondary central control unit 17. The AV mouse 18 is also used as a remote control signal transmission circuit for transmitting an infrared remote control signal to the remote commander 3.

As illustrated in FIG. 1, the television receiver 1 further includes an Internet port 19 for connection to the Internet, a memory port 20 for connection to a stick-type memory, and a USB port 21 for connection to a USB device. In the other respects, the television receiver 1 has the same structure as well-known television receivers.

Next, a method for presetting, in the remote commander 3, the remote control codes for each of the DVD player 4, the video tape recorder 5, and the audio amplifier 6, which are exemplary subordinate devices in relation to the television receiver 1 that constitutes the main device, will now be described below.

In the description of this embodiment, it is assumed that the DVD player 4 is a DVD player from Manufacturer A with a setting number of 005, that the video tape recorder 5 is a video tape recorder from Manufacturer B with a setting number of 105, and that the audio amplifier 6 is an audio amplifier from Manufacturer C with a setting number of 701.

First, a method for presetting, in the remote commander 3, the remote control codes for the DVD player 4 will now be described with reference to flowcharts of FIGS. 5A to 7.

Figure 5A:
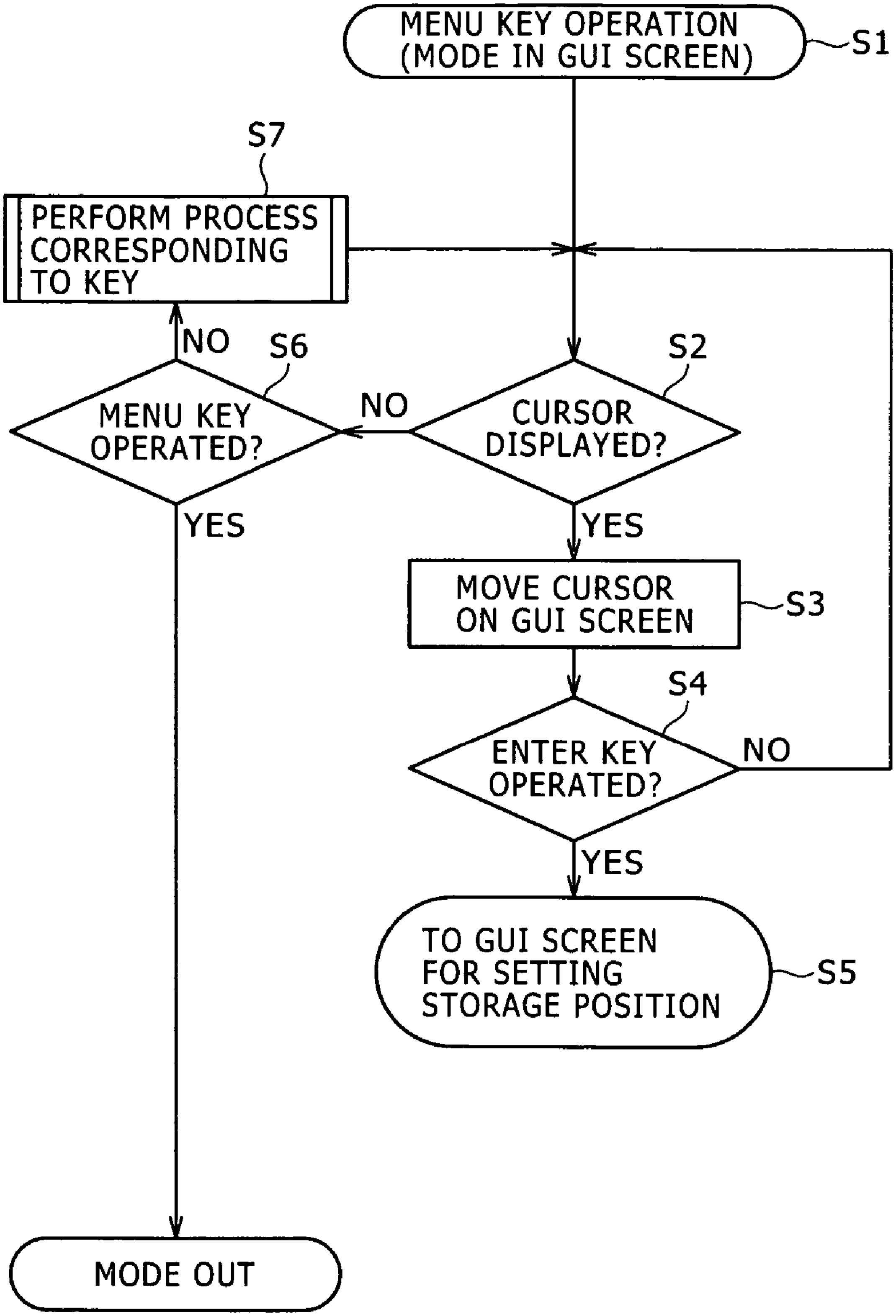
FIG. 5A to 5D are flowcharts for explaining one embodiment of the present invention.
Figure 5B:
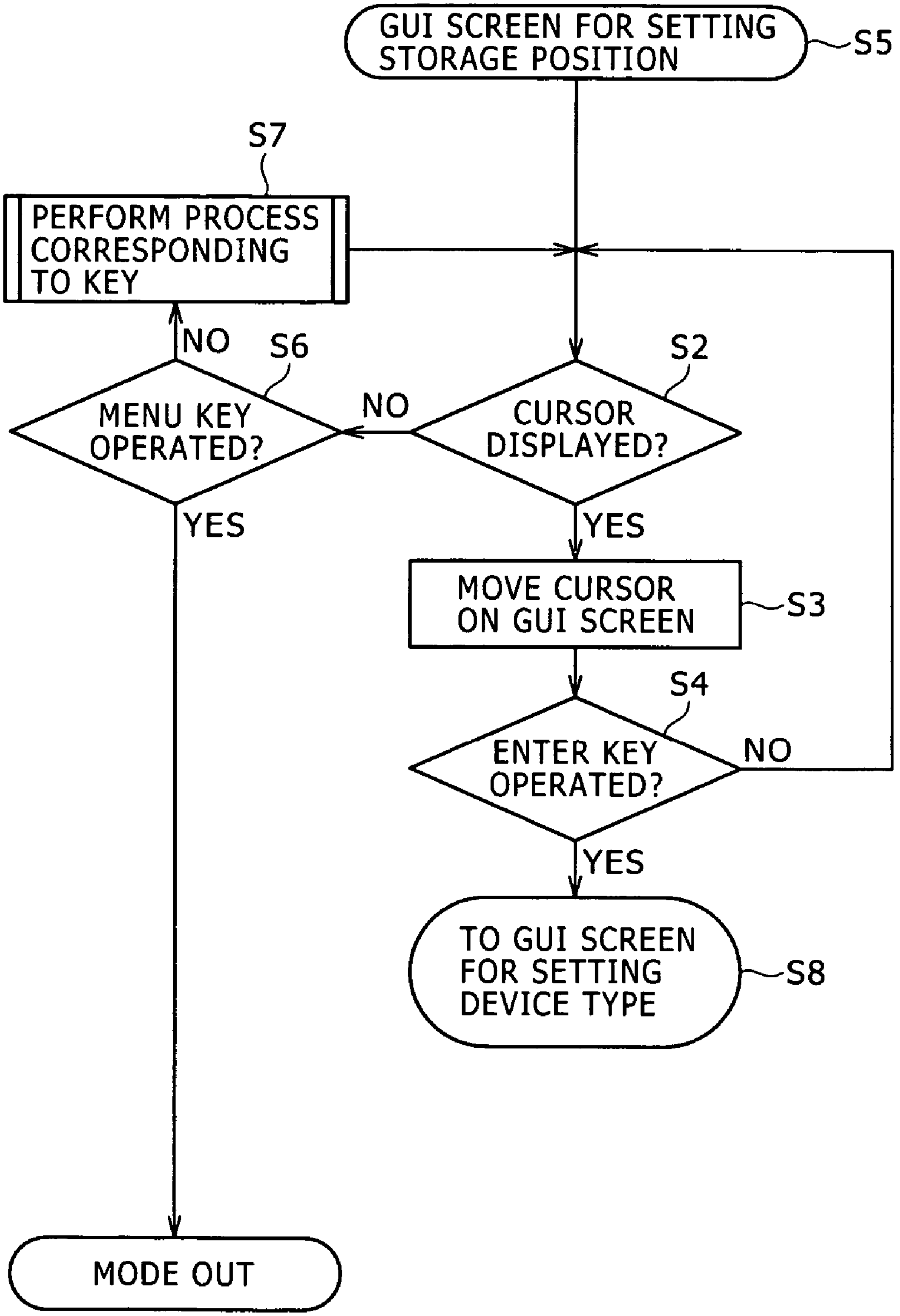
Figure 5C:
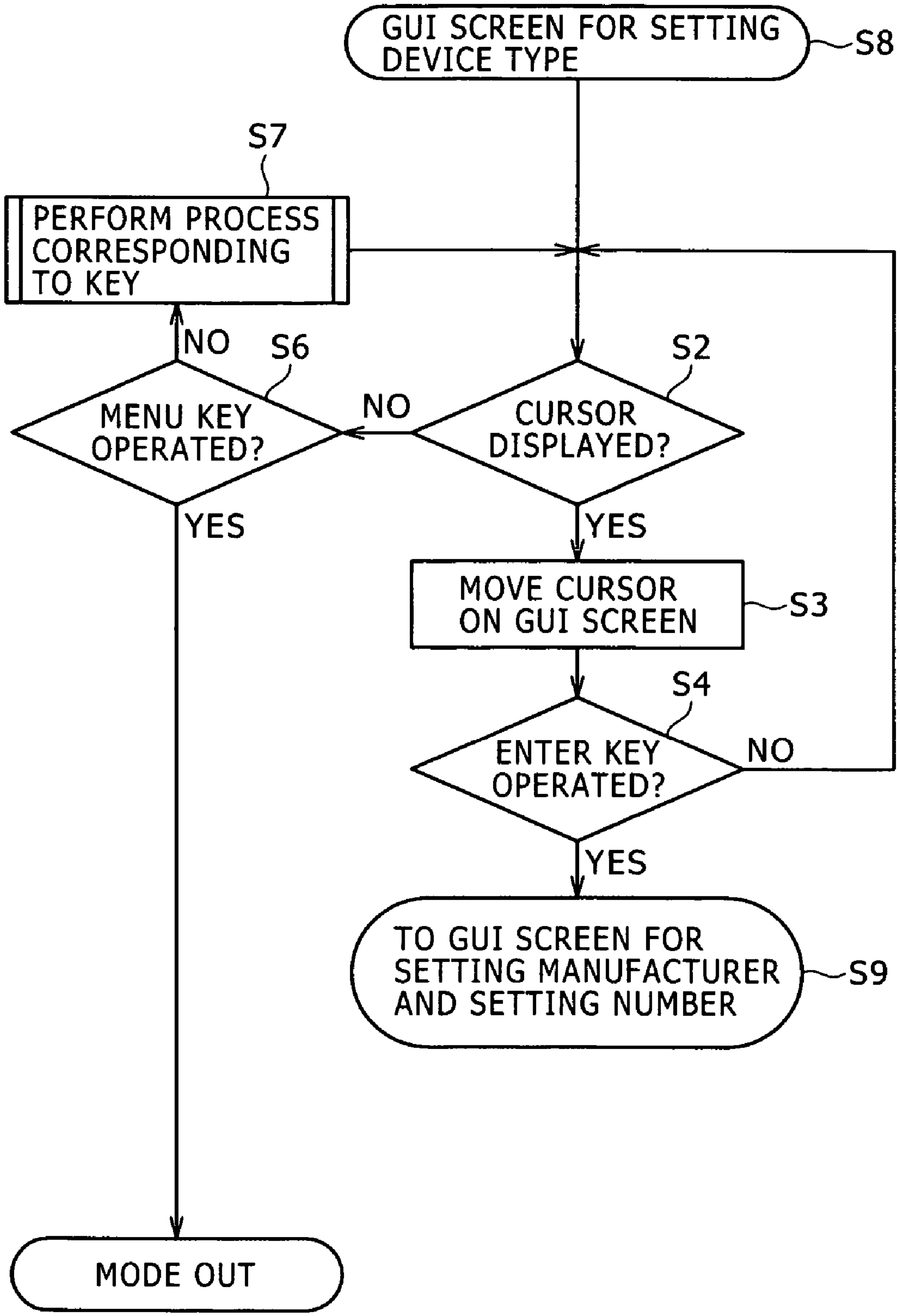

In this case, as shown in FIG. 5A, the menu key 9 of the remote commander 3 is operated (step S1). At this time, the menu screen showing the menu items as illustrated in FIG. 8 is displayed on the video display section 1*b* of the television receiver 1.

Figure 9:
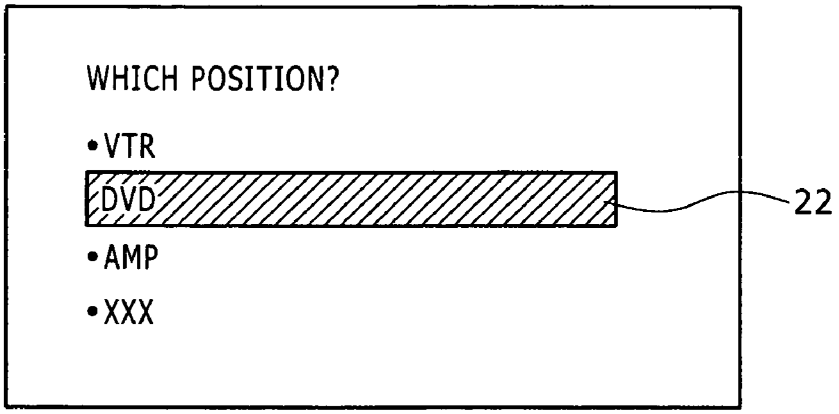
FIG. 9 is a diagram for explaining one embodiment of the present invention.

Then, it is determined whether the cursor 22 is being displayed (step S2). If the cursor 22 is being displayed, in the case of this example, the cursor 22 on the GUI screen is moved to "REMOTE CONTROL PRESET SETTING" using the select key 10 (step S3), and thereafter the enter key 11 is operated (step S4). At this point, a screen as illustrated in FIG. 9 is displayed (step S5). This screen is used to select which position (i.e., one of the storage regions 15*a*, 15*b*, 15*c*, and 15*d*) in the remote control code storage device 15 of the remote commander 3 is to be used for setting (i.e., storing) the remote control codes for the DVD player 4.

If it is determined at step S2 that the cursor 22 is not being displayed, it is determined whether the menu key 9 has been operated (step S6). If it is determined that the menu key 9 has been operated, this mode is terminated. Meanwhile, if it is determined that the menu key 9 has not been operated, a process corresponding to a key that has been operated is performed (step S7). If it is determined at step S4 that the enter key 11 has not been operated, control returns to step S2.

An operation of setting the storage position using the displayed screen as shown in FIG. 9 is also performed in accordance with the flowcharts of FIGS. 5A to 5D. That is, it is determined at step S2 whether the cursor 22 is being displayed. If the cursor 22 is being displayed, in the case of this example, the cursor 22 on the GUI screen is moved to "DVD" using the select key 10 as illustrated in FIG. 9 assuming that the storage region 15*b* primarily designed for a DVD player is to be selected as the storage position (step S3), and thereafter the enter key 11 is operated (step S4).

Figure 10:
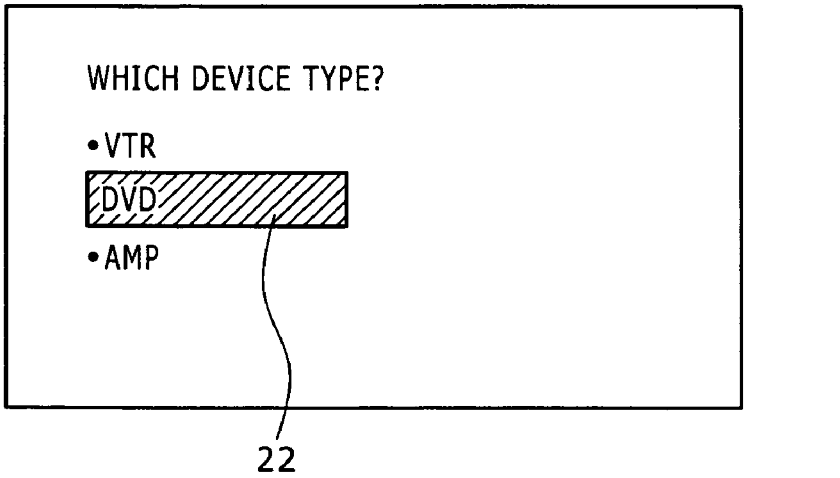
FIG. 10 is a diagram for explaining one embodiment of the present invention.

At this point, a screen as shown in FIG. 10 is displayed (step S8). This screen is used to select the type of a device (which is, in the present example, a DVD player 4) whose remote control codes are to be set (i.e., stored) in the selected storage position (which is, in the present example, the storage region 15*b*).

An operation of setting the type of device using the displayed screen as shown in FIG. 10 is also performed in accordance with the flowcharts of FIGS. 5A to 5D. That is, it is determined at step S2 whether the cursor 22 is being displayed. If the cursor 22 is being displayed, the cursor 22 on the GUI screen is moved to "DVD" using the select key 10 (step S3), and thereafter the enter key 11 is operated (step S4).

At this point, it has been decided that remote control codes for a DVD player will be stored in the selected storage position, i.e., the storage region 15*b* primarily designed for a DVD player in the remote control code storage device 15. Note that the remote control codes for the DVD player 4 need not be stored in the storage region 15*b* primarily designed for a DVD player. If so desired, remote control codes for any other type of device may be stored in the storage region 15*b* to remotely control the other type of device using the remote commander 3.

Figure 11:
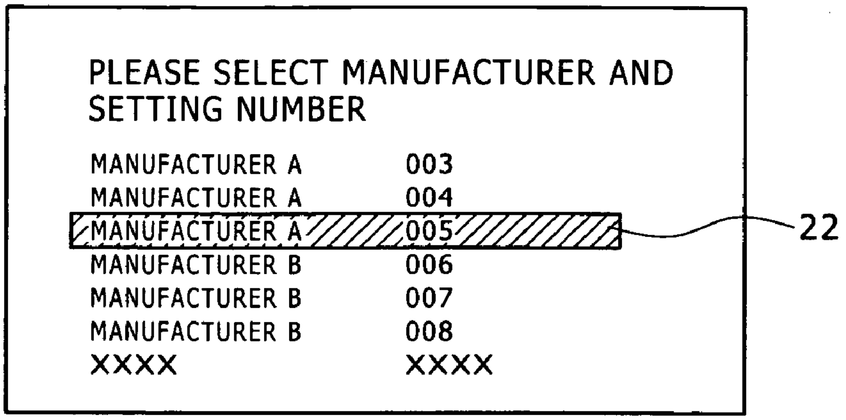
FIG. 11 is a diagram for explaining one embodiment of the present invention.

When the enter key 11 has been operated at step S4, a screen as shown in FIG. 11 is displayed (step S9). This screen is used to select a manufacturer (i.e., a company) and a setting number of the DVD player.

Figure 5D:
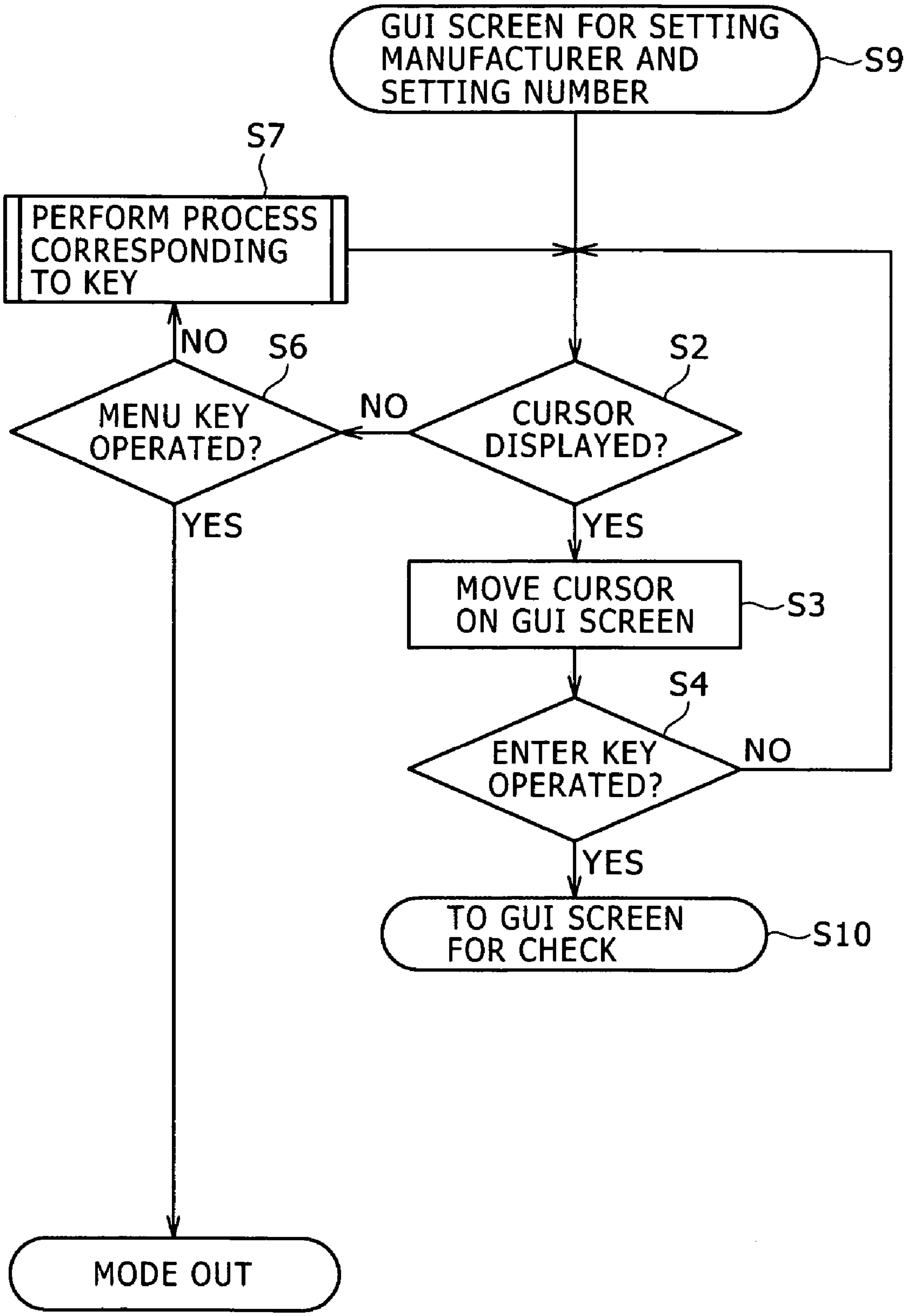
Figure 12:
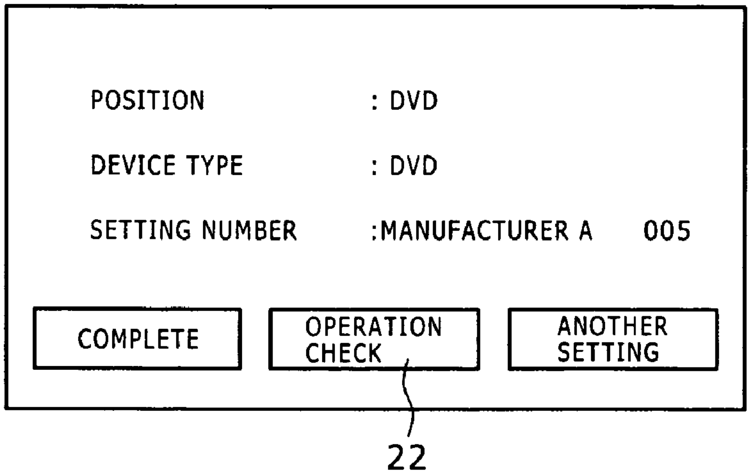
FIG. 12 is a diagram for explaining one embodiment of the present invention.

An operation of selecting the manufacturer (company) and the setting number using the displayed screen as shown in FIG. 11 is also performed in accordance with the flowchart of FIG. 5D. That is, it is determined at step S2 whether the cursor 22 is being displayed. If the cursor 22 is being displayed, the cursor 22 on the GUI screen is moved to "MANUFACTURER A 005" using the select key 10 as shown in FIG. 11 because the DVD player 4 corresponds to "MANUFACTURER A 005" (step S3), and thereafter the enter key 11 is operated (step S4). At this point, a screen as shown in FIG. 12 is displayed (step S10). This screen is used to check setting contents.

Figure 6:
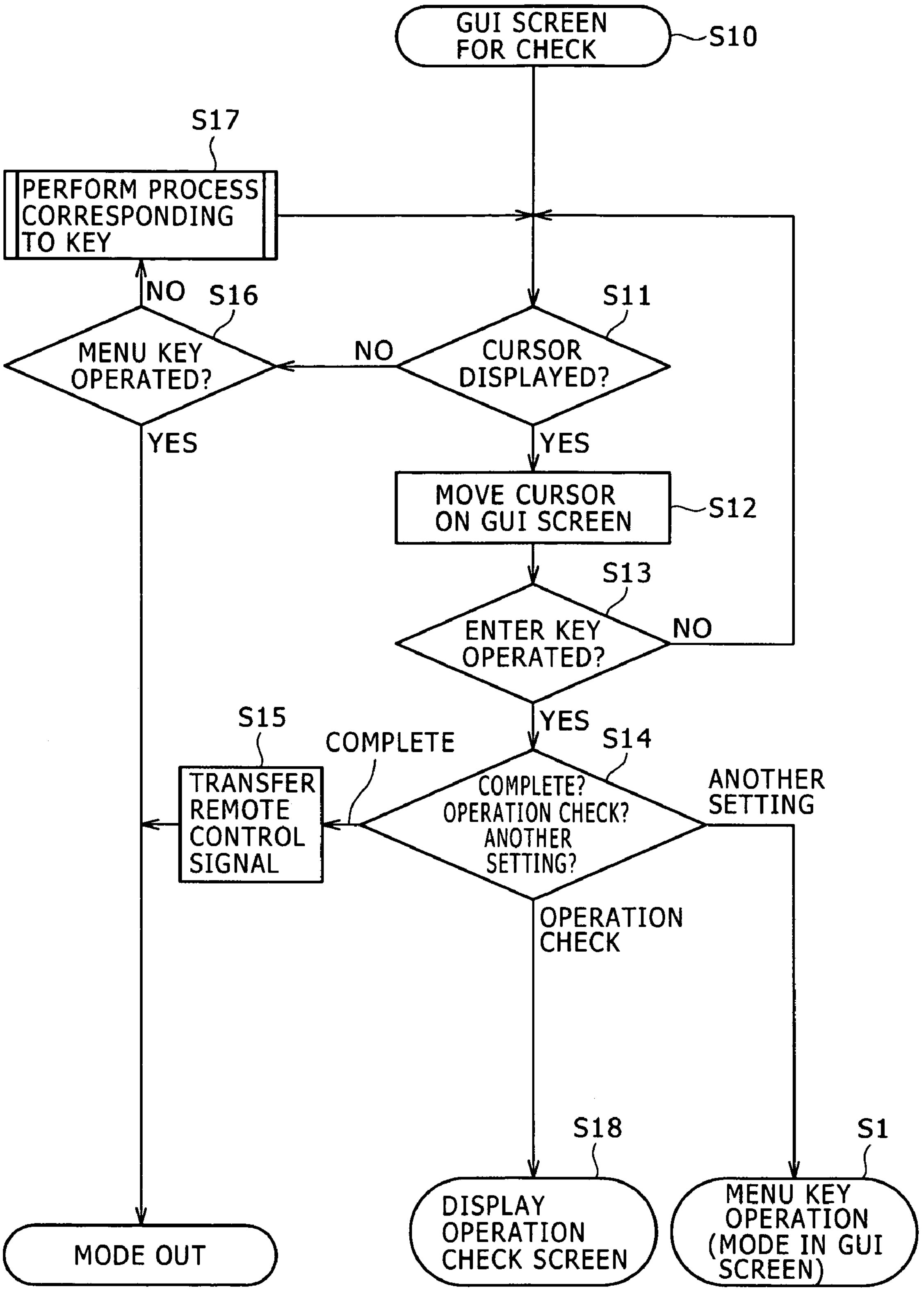
FIG. 6 is a flowchart for explaining one embodiment of the present invention.

When the setting content check screen as shown in FIG. 12 has been displayed, an operation is performed in accordance with the flowchart as shown in FIG. 6. That is, when the setting content check screen as shown in FIG. 12 has been displayed, it is determined whether the cursor 22 is being displayed (step S11). If the cursor 22 is being displayed, the cursor 22 is moved to [COMPLETE], [OPERATION CHECK], or [ANOTHER SETTING] using the select key 10 to select that option (step S12).

When the selection has been performed using the select key 10, the enter key 11 is operated to determine the selection (step S13). Then, it is determined which option has been selected (step S14). If the selected option has been [COMPLETE], the remote control codes for the DVD player 4 [MANUFACTURER A 005] stored in the each manufacturer's/model's remote control code storage device 17*a* are converted to a remote control signal; the resultant remote control signal is transmitted to the remote control signal reception circuit 16 of the remote commander 3 via the infrared AV mouse 18; the remote control signal, which corresponds to [MANUFACTURER A 005], is converted to the remote control codes; the resultant remote control codes are written to the storage region 15*b* primarily designed for a DVD player in the remote control code storage device 15 of the remote commander 3 and stored therein (step S15); and then the operation is finished. Note that in the case where other remote control codes have previously been written in the storage region 15*b*, those remote control codes may be overwritten by the remote control codes for the DVD player 4 [MANUFACTURER A 005].

Figure 7:
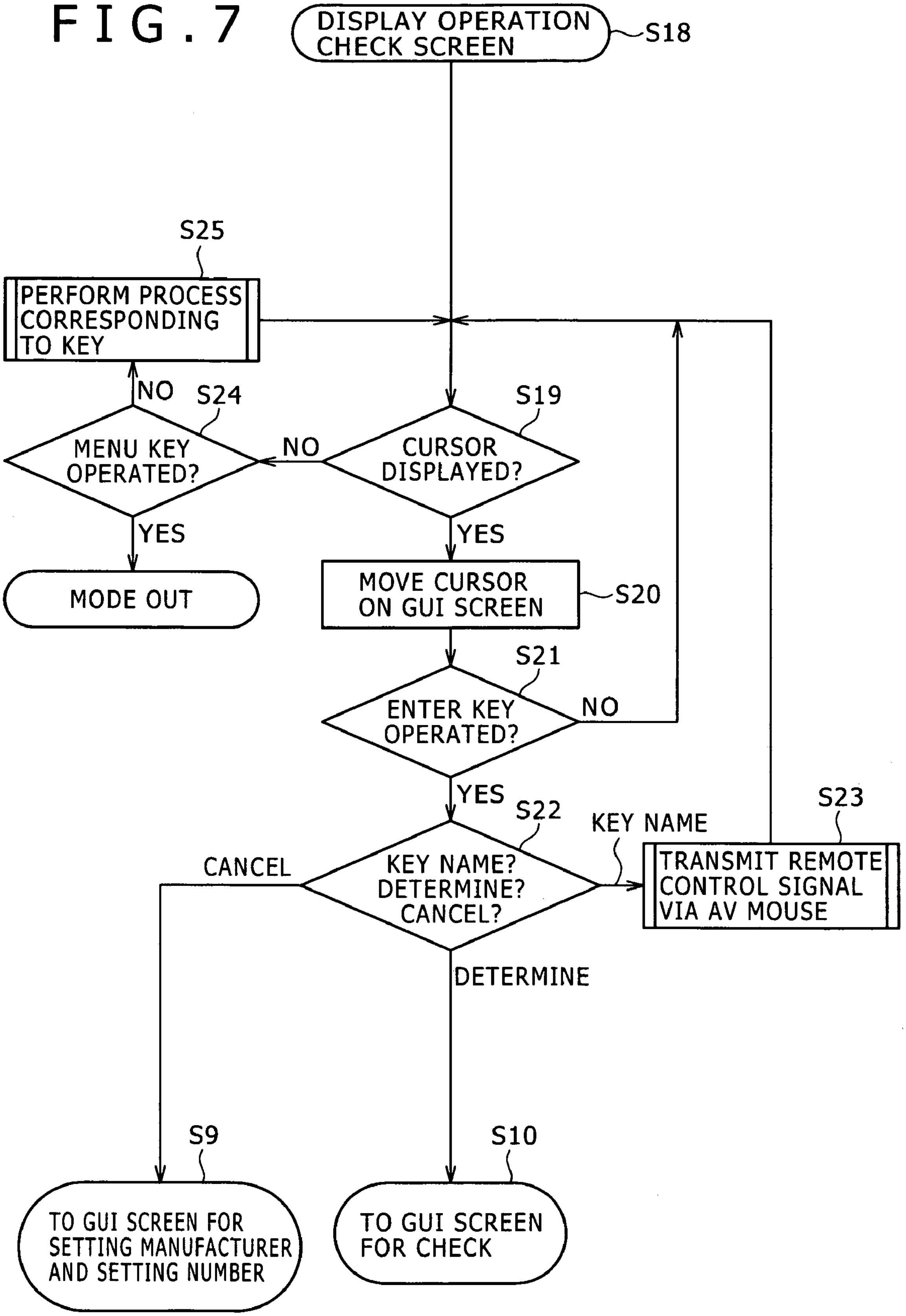
FIG. 7 is a flowchart for explaining one embodiment of the present invention.
Figure 13:
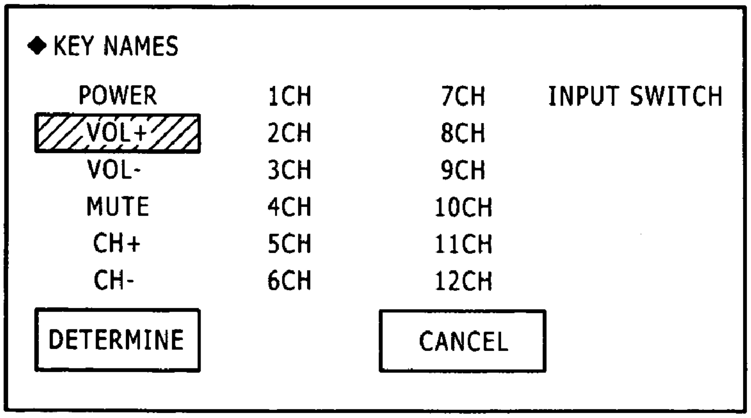
FIG. 13 is a diagram for explaining one embodiment of the present invention.

Meanwhile, if the selected option determined at step S14 is [ANOTHER SETTING], control proceeds to step S1, and another-setting is performed in a manner similar to that described above. Meanwhile, if the selected option determined at step S14 is [OPERATION CHECK], a screen for operation check as shown in FIG. 13 is displayed (step S18), and an operation of operation-check is performed in accordance with the flowchart as shown in FIG. 7.

If it is determined at step S11 in the flowchart of FIG. 6 that the cursor 22 is not being displayed, it is determined whether the menu key 9 has been operated (step S16). If it is determined that the menu key 9 has been operated, this mode is terminated. Meanwhile, if it is determined that the menu key 9 has not been operated, a process corresponding to a key that has been operated is performed (step S17). If it is determined at step S13 that the enter key 11 has not been operated, control returns to step S11.

Next, the operation of operation check will now be described with reference to the flowchart of FIG. 7. When the screen for operation check as illustrated in FIG. 13 has been displayed, it is determined whether the cursor 22 is being displayed (step S19). If the cursor 22 is being displayed, the cursor 22 is moved using the select key 10 to select, on the GUI screen as illustrated in FIG. 13, one of key names, such as [VOL+], [DETERMINE], or [CANCEL] (step S20), and thereafter the enter key 11 is operated to determine the selection (step S21).

Next, it is determined which option has been selected (step S22). If the selected option is the key name [VOL+], a remote control signal of [VOL+] of [Manufacturer A 005], which was selected earlier, is transmitted via the infrared AV mouse 18 to the remote control signal reception circuit 4*a* of the DVD player 4 (step S23), whereby the remote control signal of [VOL+] is checked. This check of the remote control signal may be performed with respect to other key names a desired number of times as desired.

If the result of this operation check is favorable, [DETERMINE] is selected at step S20 and the selection is determined by operating the enter key 11. Accordingly, it is determined at step S22 that [DETERMINE] has been selected, and control proceeds to step S10. Then, the operation will be finished by way of step S11, step S12, step S13, step S14, and step S15.

Meanwhile, if the result of the operation check is not favorable, [CANCEL] is selected at step S20 and the selection is determined by operating the enter key 11. Accordingly, it is determined at step S22 that [CANCEL] has been selected, and control proceeds to step S9. Then, the screen as shown in FIG. 11 is displayed, and a manufacturer (company) and a setting number are selected in a manner similar to that described above. Thereafter, the operation will be finished after repeating steps S10 to S23.

If it is determined at step S19 in the flowchart of FIG. 7 that the cursor 22 is not being displayed, it is determined whether the menu key 9 has been operated (step S24). If it is determined that the menu key 9 has been operated, this mode is terminated. Meanwhile, if it is determined that the menu key 9 has not been operated, a process corresponding to a key that has been operated is performed (step S25). If it is determined at step S21 that the enter key 11 has not been operated, control returns to step S19.

Presetting of the remote control codes in the remote commander 3 such that the remote control codes of the video tape recorder 5 from Manufacturer B with a setting number of 105 and the remote control codes of the audio amplifier 6 from Manufacturer C with a setting number of 701 are written, perhaps involving overwriting, to and stored in the storage regions 15*c* and 15*d* in the remote control code storage device 15 of the remote commander 3 can be performed in a manner similar to that described above.

According to this embodiment, when presetting in the remote commander 3 the remote control codes of subordinate devices (e.g., the DVD player 4, the video tape recorder 5, and the audio amplifier 6) that are not stored in the remote control code storage device 15 of the remote commander 3, the remote control codes stored in the each manufacturer's/model's remote control code storage device 17*a* of the television receiver 1 are selected using the menu key 9, select key 10 and enter key 11 of the remote commander 3 and referring to a display on the video display section 1*b* of the television receiver 1, which constitutes the main device. Then, the selected remote control codes are transmitted to the remote commander 3. Thus, the operation of presetting is easy, and since the each manufacturer's/model's remote control code storage means is not provided within the remote commander 3, the remote commander 3 can be prevented from becoming complicated or costly.

Further, in the present embodiment, the remote control code storage device 15 in the remote commander 3 stores remote control codes that are actually used. Therefore, the storage capacity of the remote control code storage device 15 can be relatively small.

Still further, suppose, for example, that a new model of a DVD player has been produced by Manufacturer D and put on the market, and that a user has purchased the new model and wishes to remotely control the new model, which is connected to the television receiver 1 via an input/output port, using the remote commander 3. In this case, the user can select "PRESET UPDATE" in the menu screen of FIG. 8 and perform a process of preset update.

This process of preset update is performed as follows. First, remote control codes of the new model registered by Manufacturer D on a web page are acquired via the Internet. Alternatively, the remote control codes acquired via a personal computer may be inputted to the television receiver 1 via the USB device or the stick-type memory. Thus, the remote control codes are written to the each manufacturer's/model's remote control code storage device 17*a*. As a result, it becomes possible to write the remote control codes of the new model, involving overwriting, to any of the storage regions 15*b*, 15*c*, and 15*d* of the remote control code storage device 15 in the remote commander 3 in the above-described manner, whereby the update of the remote control codes is accomplished.

It should be understood by those skilled in the art that various modifications, combinations, sub-combinations and alterations may occur depending on design requirements and other factors insofar as they are within the scope of the appended claims or the equivalents thereof.

What is claimed is:

1. A remote control system, comprising:

a main device having a capability to connect with a subordinate device; and a remote commander, wherein said main device includes display means, first storage means for storing a plurality of sets of remote control codes for controlling different models of subordinate devices from different manufacturers, each set of remote control codes corresponding to a separate model of a subordinate device, first signal reception means for receiving from said remote commander a first remote control signal for controlling said main device, first signal transmission means for transmitting, to a subordinate device connected to said main device, a second remote control signal for controlling the subordinate device, and transmitting to said remote commander a set of remote control codes corresponding to the subordinate device stored in said first storage means, and control means for controlling said first storage means, said display means, and said first signal transmission means based on the received first remote control signal, and wherein said remote commander includes second signal reception means for receiving the set of remote control codes transmitted from said first signal transmission means, second storage means for storing the set of remote control codes received by said second signal reception means, second signal transmission means for transmitting the first remote control signal for controlling said main device and transmitting a third remote control signal based on the set of remote control codes and for controlling the subordinate device, and an operation section configured to transmit, as the first remote control signal, a first remote control code transmission control signal for causing said control means to perform remote control code transmission control for selecting the set of remote control codes for controlling the subordinate device from among the plurality of sets of remote control codes stored in said first storage means of said main device and transmitting the set of remote control codes via said first signal transmission means, wherein said operation section transmits, before said first signal transmission means transmits the set of remote control codes to said remote commander, a second remote control code transmission control signal to said first signal reception means for causing said control means to transmit a selected remote control code to the subordinate device in one signal via said first signal transmission means to check whether the set of remote control codes correspond to the subordinate device.

2. The remote control system according to claim 1, wherein said operation section comprises:

a menu key configured to transmit a remote control code transmission control signal for causing a menu having a hierarchical structure used for the remote control code transmission control to be displayed on said display means;

a select key configured to select an item displayed in the menu; and an enter key configured to determine selection by the select key.

3. The remote control system according to claim 1, wherein the plurality of sets of remote control codes stored in said storage means of said main device are capable of being updated.

4. The remote control system according to claim 1, wherein said first and second signal transmission means are configured to transmit infrared signals, and said first and second signal reception means are configured to receive infrared signals.

5. The remote control system according to claim 1, wherein said main device is a television receiver, and said subordinate device is an external input device.

6. A presetting method for a remote commander in a remote control system including the remote commander and a main device having a capability to connect with a subordinate device, the method comprising:

a first step of storing, in first storage means provided in the main device, a plurality of sets of remote control codes for controlling different models of subordinate devices from different manufacturers, each set of remote control codes corresponding to a separate model of a subordinate device;

a first step of transmitting a first remote control code transmission control signal via first signal transmission means provided in the remote commander;

a first step of receiving the first remote control code transmission control signal transmitted in said first transmitting step;

in accordance with the remote control code transmission control signal received in said first receiving step, a step of selecting a set of remote control codes corresponding to a subordinate device connected to the main device from among the plurality of sets of remote control codes stored in said first storing step;

a step of, before said first signal transmission means transmits the set of remote control codes selected in said selecting step to said remote commander, transmitting a second remote control code transmission control signal to said first signal reception means for causing said main device to transmit a selected remote control code in one signal to the subordinate device via second signal transmission means to check whether the set of remote control codes correspond to the subordinate device;

a second step of transmitting the set of remote control codes selected in said selecting step via said second signal transmission means provided in the main device;

a second step of receiving the set of remote control codes transmitted in said transmitting of the set of remote control codes via second signal reception means provided in the remote commander; and a second step of storing the set of remote control codes received in said second receiving step of the set of remote control codes in second storage means provided in the remote commander.

* * * * *